(12) United States Patent
Kits van Heyningen (10) Patent No.: US 6,310,832 B1
(45) Date of Patent: Oct. 30, 2001

(54) INTERPOLATED BEAMFORMING TRACKER

(75) Inventor: Arent H. Kits van Heyningen, Newport, RI (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 06/442,484

(22) Filed: Nov. 17, 1982

(51) Int. Cl.[7] .................................................. G01S 3/808
(52) U.S. Cl. ............................................................ 367/122
(58) Field of Search .............................. 367/12, 119, 122, 367/123, 125

(56) References Cited

U.S. PATENT DOCUMENTS

| | | | |
|---|---|---|---|
| 3,302,204 | * | 1/1967 | Mathes .................................. 367/125 |
| 3,307,141 | * | 2/1967 | Saxton et al. ..................... 367/125 X |
| 3,555,500 | * | 1/1971 | Longerich et al. .............. 367/125 X |
| 3,750,152 | * | 7/1973 | Waful .............................. 367/125 X |
| 3,821,740 | * | 6/1974 | Ehrlich .............................. 367/123 X |
| 3,906,431 | * | 9/1975 | Clearwaters et al. ................. 367/122 |
| 4,001,763 | * | 1/1977 | Kits van Heyningen .............. 367/12 |

\* cited by examiner

*Primary Examiner*—Daniel T. Pihulic
(74) *Attorney, Agent, or Firm*—Daly,Crowley & Mofford,LLP (57) ABSTRACT

The invention in its preferred embodiment is applied to a spherical assembly of rows of transducer elements arranged in a uniform distribution of elements in each circular row, each row being at a different latitude. The beamforming is accomplished in two steps. First, vertically oriented fan-shaped left and right half beams are formed by a portion of the transducers in each selected row within an elliptical array of transducers. Two adjacent left and right half beams are formed per row. These beams are angularly spaced by the included angle of two adjacent transducers of that row. By a process of interpolation of signals received from a signal source by the left half beams and the right half beams, respectively, resultant left and right half beams with a main response axis in the source azimuth direction are obtained. The resultant right and left half beams in adjacent rows within the array are combined in a second beamformer to provide upper and lower beams for each half beam (four quadrant beams) and a sum beam. The quadrant beam signals are provided to circuitry which generates the up/down and the left/right error signals which are used to control the main response axis directions of the four quadrant beams so that they are centered on the signal source.

9 Claims, 9 Drawing Sheets

INTERPOLATED BEAMFORMING TRACKER

BACKGROUND OF THE INVENTION

This invention relates to a steerable beamformer for a sonar system and more particularly to a steerable beamformer which utilizes solid state components to form and steer the sonar beam so that tracking of a sonic emitter may be achieved without any mechanically moving components.

The preferred embodiment of the invention will be described as a replacement for a tracking sonar which uses a mechanical scanning element to make selective contact with the acoustic transducers substantially uniformly distributed over a spherical surface. The spherical surface typically has greater than 1200 transducers of which the mechanical scanner makes contact with greater than 200 elements. The desire for making a smooth transition between the electrical contacts of adjacent transducers while avoiding transients produced by the switching from one transducer to another within the mechanical scanner makes it necessary to utilize complex brush arrangements with small mechanical tolerances thereby resulting in great expense for the fabrication of such a mechanical scanning device. In addition, the mechanical scanner requires considerable volume which in some sonar applications is at a premium and could be better utilized, as in this invention, by providing a space for the electronic components of the sonar system. Finally, the mechanical scanner requires highly skilled maintenance personnel and repairs can only be made at base facilities specially equipped for this purpose.

It is therefore an object of the present invention to provide a solid state tracking system instead of a mechanical scanner. It is a further object of the invention to provide a tracker which has smooth and accurate beam steering with the absence of transients produced by the transfer to adjacent transducers during the process of moving the tracking beam.

It is a further object of the invention to maintain accurate depression/elevation steering at angles where the mechanical scanner starts to lose contact with transducers because of the truncation of the transducers on the sphere at large depression or elevation angles. It is a further feature of the invention that a relatively small volume and low power are required relative to the mechanical scanner.

Another major feature is the absence of special maintenance requirements since repair is done at the electronic module level which requires electronic technician skills readily available onboard ships.

SUMMARY OF THE INVENTION

A beamformer is described in which the transducers are uniformly arranged in horizontal rows on a spherical surface. Each adjacent transducer of a row provides in parallel a signal to a corresponding adjacent storage stage of a charge coupled type shift register. The shift register has a predetermined number of adjacent stages corresponding to the number of transducers within the array forming the beam which stages are gated into a beamforming circuit which provides a left half and a right half fan shaped beam in the direction transverse to the row. The azimuthal direction of the fan shaped beams is determined by a gating signal occuring at the appropriate time as the shift register information is shifted past the beamforming circuitry to select the azimuthal group of transducers whose signals, when beamformed, will produce a beam in the desired direction. Interpolation between adjacent fan shaped beams of a row is obtained by generating two adjacent fan shaped beams, each having a left half beam and a right half beam. Each corresponding half is multiplied by a quantity "A" and "(1−A)" respectively and added to cause the resulting interpolated left and right half fan shaped beams to have their main response axis on the signal source within the angle between the adjacent fan shaped beams and to make transitions between adjacent beams without transient electrical effects. The right and left half beam signals from a signal source provided by the interpolated beams of all rows within the array have the same azimuthal direction and are provided to declination/elevation beamformers in which the right half beam signals provide an upper right half beam and a lower right half beam signal. Similarly, the left half beam provides an upper left half beam and a lower left half beam signal. The output signals of these four quadrant beams from a target signal generate up/down and left/right error signals which are provided as inputs on the tracking circuitry and determine the direction of the quadrant beams.

BRIEF DESCRIPTION OF THE INVENTION

The aforementioned aspects and other features of the invention are explained in the following description taken in conjunction with the accompanying drawings wherein.

DESCRIPTION OF THE PREFERRED EMBODIMENT

Figure 1:
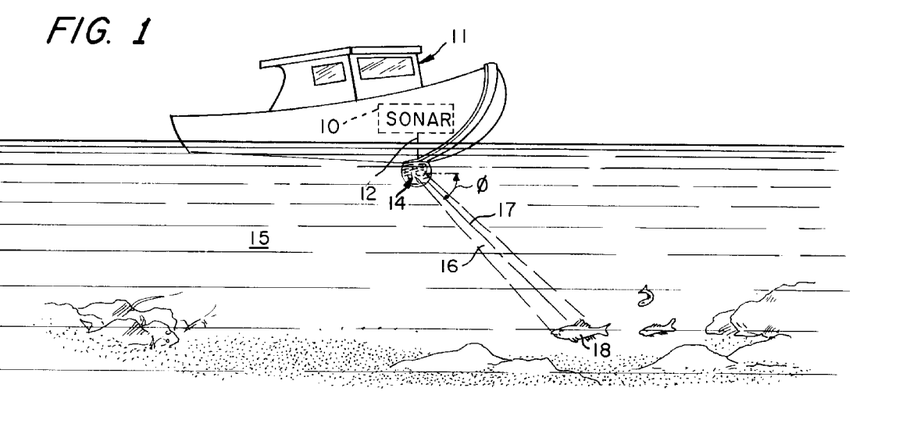
FIG. 1 is a pictorial view of the environment in which the sonar system of the invention is employed.

FIG. 1 shows an environment in which the sonar system of this invention may be employed. The sonar system electronics unit 10 is shown within the ship 11 connected by means of electrical cable 12 to each of the transducers 13 of the hull-mounted spherical assembly 14 of transducers 13. The sonar electronics unit 10 is shown contained within the hull of the ship although it should be understood that a feature of this invention is that at least a portion of electronics unit 10 may be contained within that portion of the spherical assembly 14 which is not occupied by the transducers 13. The transducer assembly 14 is immersed in a water environment 15 and produces a beam 16 whose main response axis 17 is directed upon a signal source 18 which is represented by a fish. The beam 16 is comprised of four quadrant beams, the upper-right, the lower-right, upper-left and lower-left beams, which detect signals from signal source 18 and provide error signals from which its main response axis 17 is caused to track the source 18 and to provide its relative direction with respect to the ship 11. The signal source 18 provides a signal either by reflecting a signal produced by the transmitter of sonar system 10 which is connected to the transducers 13 of assembly 14 to provide a search beam in the usual manner or by reason of itself being a noise source. The quadrant beams are depicted in FIG. 1 as being spatially coextensive with the beam 16. However, the quadrant beams have spaced phase centers 21, 22, 23, 24 as shown in FIG. 2 from which, by well-known phase detection techniques, error signals are produced to control the direction of the main response axis 17 to point at source 18.

Figure 2:
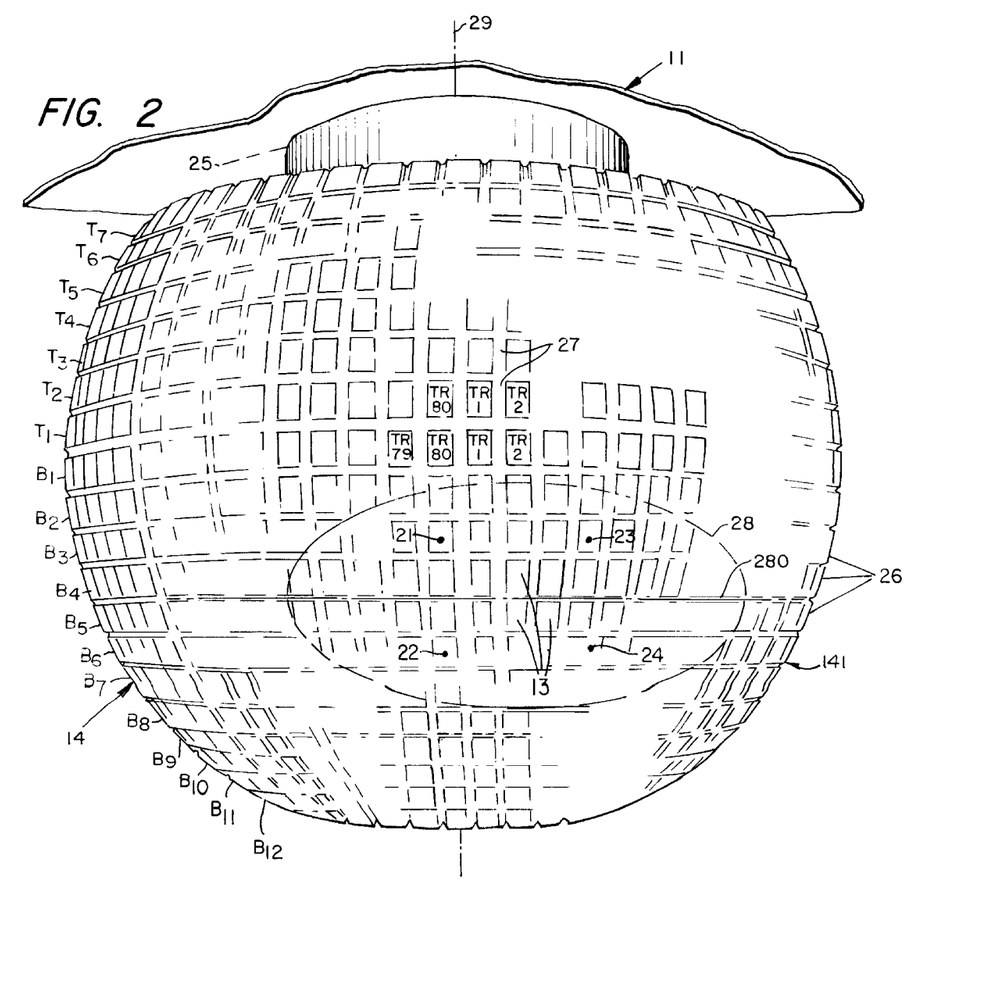
FIG. 2 is a pictorial view of the spherical transducer assembly used in the preferred embodiment of the invention.

A detailed view of the transducer spherical assembly 14 attached to the ship 11 by a mount 25 is shown in FIG. 2. In the preferred embodiment of this invention, the transducers 13 are arranged in circular rows 26 on the surface of the spherical assembly 14. The nineteen rows 26 are identified by the letters T7 through B12, according to the location of the row in the top (T) or bottom (B) hemisphere of the sphere 14. In a preferred embodiment, there are seven rows of transducers in the top hemisphere and twelve rows of transducers in the bottom hemisphere because top-mounting of the sphere 14 to the bottom of ship 11 allows a greater portion of the bottom hemisphere to be used. The number of transducers 13 in a row 26 varies in increments of twenty dependent upon the latitude of the row, from forty in rows Bll, B12 (9° transducer element 13 spacing); sixty in rows T6, T7 and B6–B10 (6° spacing); to eighty in rows T5–B5 (4.5° spacing). Since the rows, for example T5–B5, have an equal number of longitudinally aligned transducers 13 but have different circumferences, these adjacent rows will have a different circumferential spacing 27 between transducer elements 13. The transducers 13 extend toward the center of the sphere 14 but occupy only a small portion of the volume of the sphere. The remaining hollow portion of the sphere 14 is then available for electronic circuitry.

Also shown in FIG. 2 is the elliptical outline of the array 28 of transducers 13 which typically are used in forming a beam 16. The major axis 280 of the elliptical array 28 typically may contain twenty-four transducers and the minor axis may extend over ten rows and hence would contain ten transducers. The normal at the center of the elliptical array 28 or the sphere 14 determines the direction of the beam 16 and is determined by gating on those transducers which fall within the desired location of array 28.

Figure 3:
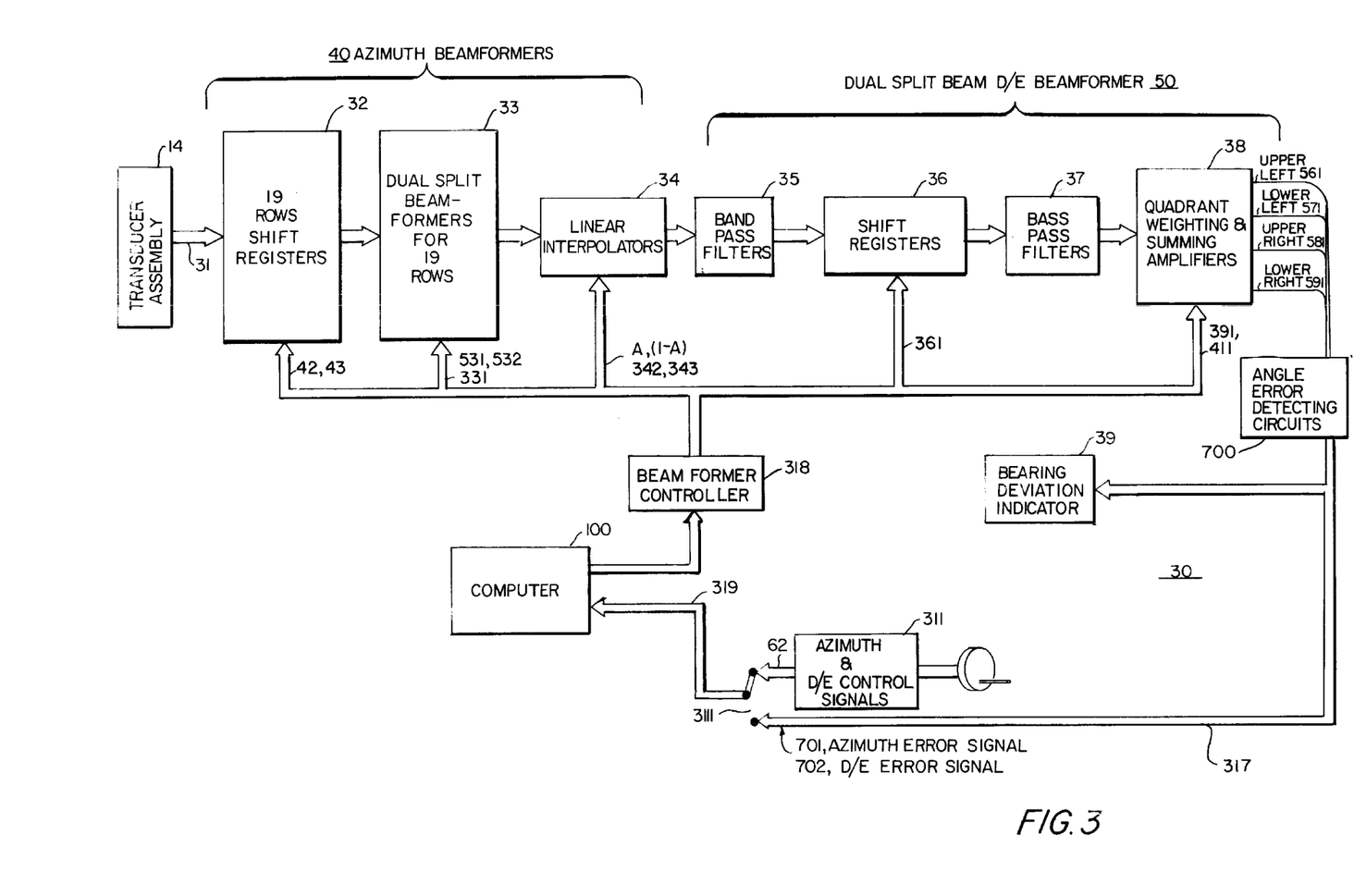
FIG. 3 is a block diagram of the tracking system of the invention.

Referring now to FIG. 3, there is shown a block diagram of the tracking system 30 of this invention. The input lines 31 carry the signals from each row 26 of the transducers 13 of transducer assembly 141 arranged in nineteen rows T7 through B12 on the surface of the sphere 14. The signals on lines 31 of each row 26 of transducers goes to its respective parallel in/parallel out shift register 32. Each shift register 32 provides signals to its corresponding dual or left-and-right-half (split beam) beamformers 33. Each beamformer 33 of the dual beamformers provides a left half and right half vertical fan-shaped beam signal to an interpolator 34. Interpolator 34 combines the two left half beam signals and the two right half beam signals to provide an interpolated left half beam signal and an interpolated right half beam signal of each row. The left half and right half beam output signal from each of the interpolators 34 of each row are provided to band-pass filters 35 which filter out the sample or latch pulse frequency 531 of the latch 52 of beamformer 33 output signals 382, 383 and reconstruct the signals to their initial unsampled form prior to the signals going into the shift registers 36 of dual or split-beam depression/elevation beamformers 50 of FIG. 5 where the signals are sampled in shift registers 36. Following the shift registers 36 are the bandpass filters 37 which filter out the shift frequencies 531 in the shift registers' 36 output signals 361 prior to the signals 361 being provided to quadrant beam weighting and summing amplifiers 38. The summing amplifiers' 38 signal outputs, the upper left, lower left, upper right and lower right quadrant beam signals 561, 571, 581 and 591 formed by the beamformers 50 of FIG. 6, are presented to angle-error detecting circuits 700 of FIG. 7 whose outputs 701, 702, the right/left error signal and the up/down error signals, respectively, are provided through switch 3111 to computer 100 for providing tracking signals to beamformer controller 318. The output signals 701, 702 are also provided to a bearing deviation indicator 39 of FIG. 3 for a visual indication of tracking accuracy. Manual control 311 provides up/down and left/right tracking signals on line 62 which are alternatively provided through switch 3111 to computer 100. In response to the error signals on input line 319, the computer 100 causes the beamformer controller 318 to provide the necessary shift frequencies, gating pulses, and weighting functions which are required to form quadrant beams which have their main response axes in the direction of the target signal source 18 which is being tracked.

Figure 4:
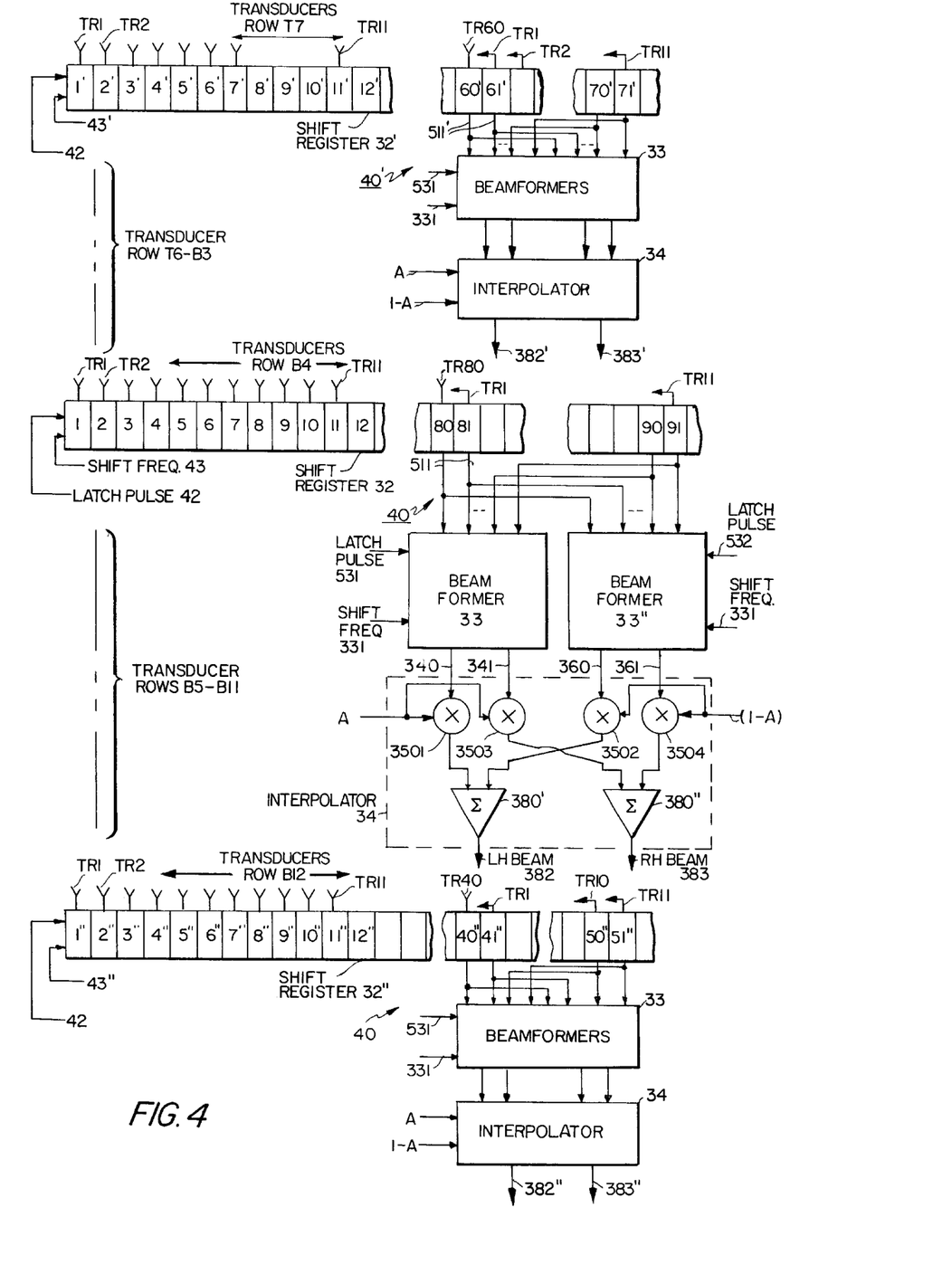
FIG. 4 is a block diagram of the right and left half beam beamformer system for each row of transducers.

Referring to FIG. 4, there is shown in block diagram form the beamforming circuit 40 for providing an interpolated left half beam signal 382 and the right half beam signal 383 for each row 26 of selected transducer elements 13. A charge transfer shift register 32 has each storage element 411 connected to its respective transducer 13 of a row 26. A predetermined number of adjacent transducers, $TR_1$–$TR_{12}$, of each row are connected to more than one storage element 411 (storage elements 1–12 and 81–92 of register 32 of row B1 FIG. 4). The number of storage cells connected to more than one transducer is not less than the number of transducers on the major axis 280 of the aperture ellipse 28. Since FIG. 2 shows a maximum of twelve transducers encompassed by the major axis 280 of the elliptical array 28 in the preferred embodiment, the shift register 32 must have at least eleven more storage elements 411 than the number of transducers in the row 26 to which the register 32 is connected. Therefore, the number of cells required in registers 32 connected to the rows B5–T5 having eighty transducers is not less than ninety-one.

For transducer rows where the number of transducers is less than eighty, i.e., sixty or forty, the number of cells in their respective registers 32', 32" need only be equal to the number of transducers of its row plus the eleven cells required for transducers TR1–TR11. Rows such as topmost row $T_7$ and the bottommost row $B_{12}$ do not require eleven extra storage cells 411 since they are at the extremes of the minor axis of the elliptical array 28 but appropriate gating in bandpass 33 of the cells' 411 outputs 51 will provide only those transducer signals which are desired.

Reference to the eighty transducers TR1–TR80 of row B4 shown in FIG. 4 shows that information is provided in parallel from the transducers 13 to the cells 411 of storage register 32 and is gated into the register 32 by a latch pulse 42 which has a frequency greater than twice the highest frequency of the signal to be detected by the transducers 13. In the preferred embodiment, a 40 KHz latch signal is utilized. After the signals from the transducers 13 are latched into the shift register 32, the shift frequency signal 43 shifts the information through the shift register cells 80–91 which are connected to the beamformers 33' and 33". The shift frequency for the storage register 32 connected to rows having eighty transducer elements is therefore at least 3.64 MHz, the sampling latch frequency (ninety one, the number of cells connected by eighty transducers, multiplied by forty thousand) in order to shift the sampled information in the cells through the register before the next sample.

There are twelve inputs 511 to each beamformer 33, all of which may not be gated into the beamformer depending upon the position of the row within the array. For example, the beamformers 33' and 33" connected to the shift register of the topmost row of transducers 13, row $T_7$, will have a maximum 10 of six transducers forming the topmost row within the elliptical aperture 28. The six transducers are selected by applying latch pulses 531 to the appropriate latches 52 of beamformers 33', 33" at the time that the six desired transducers have their latched sampled signals in the register cells 84–89 which are centered about the central dividing line 56 of the beamformer 33 shown in FIG. 5.

Figure 5:
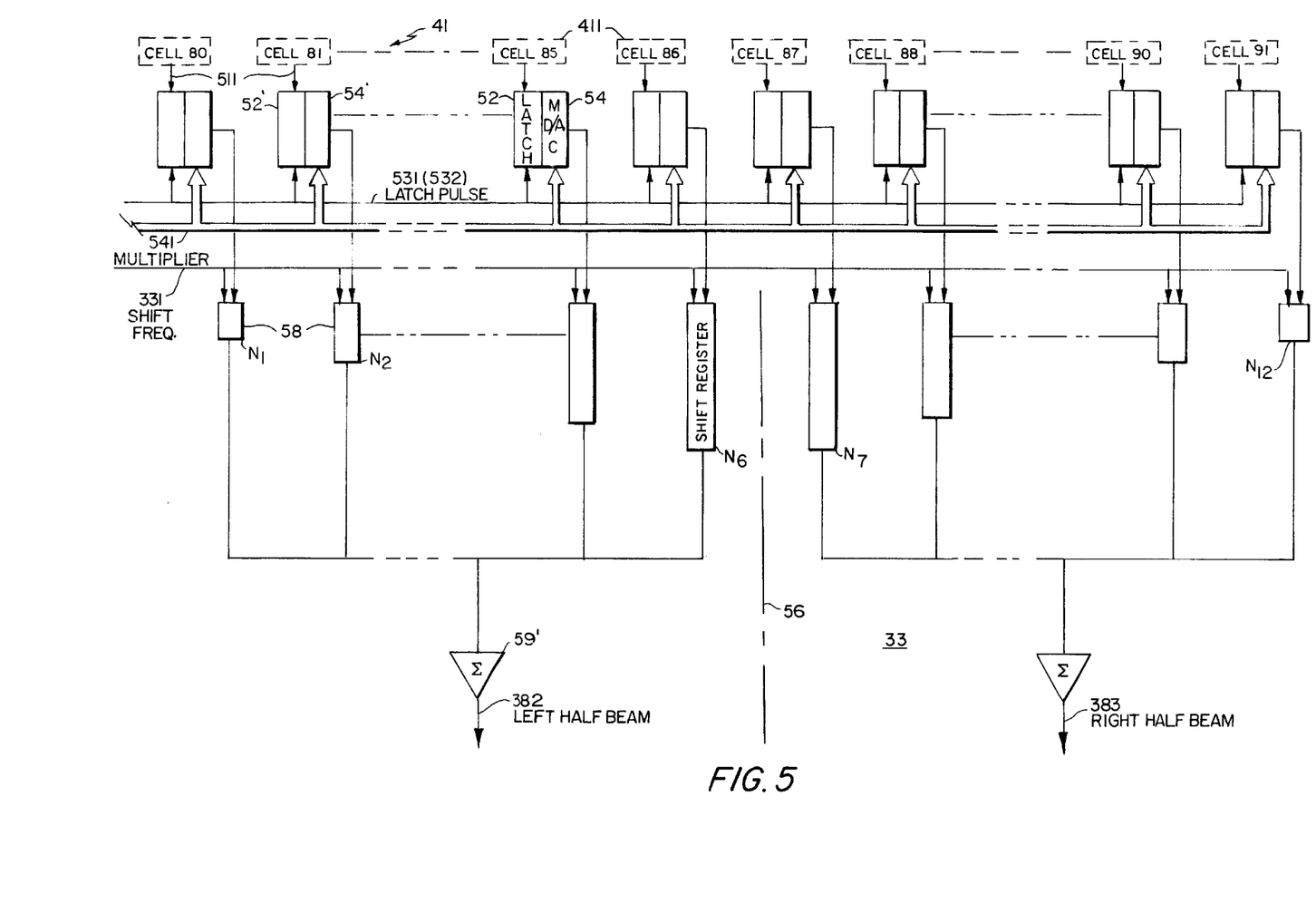
FIG. 5 is a block diagram of the beamformer circuit used in the beamformer system of FIG. 4.
Figure 6:
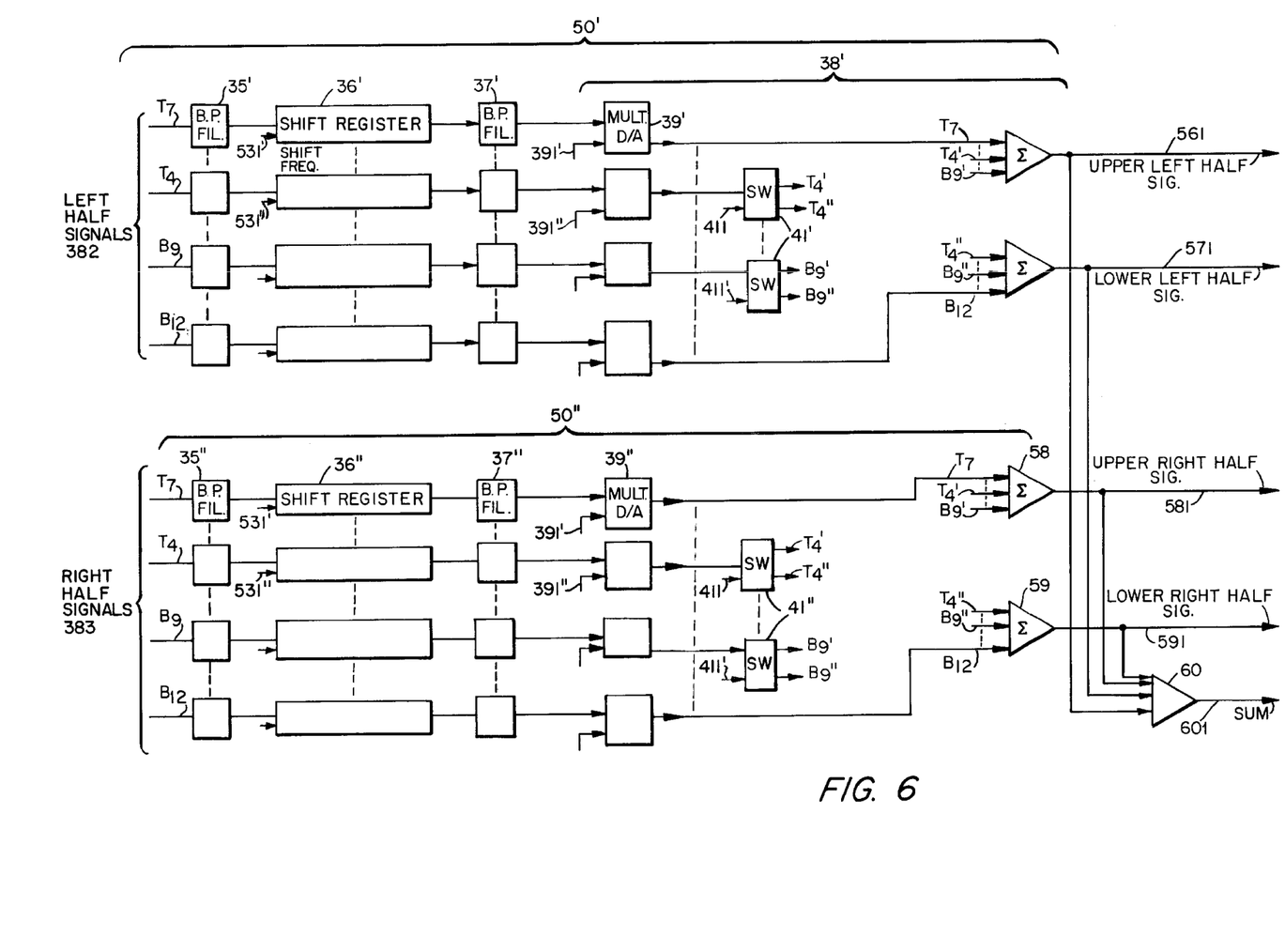
FIG. 6 is a block diagram of the depression/elevation beamformer which forms the quadrant beams from the vertical fan-shaped right and left half row beams.

As seen in FIGS. 3, 4, 5, each beamformer 33 has twelve input lines 51 from twelve adjacent cells 80–91 of the shift register 32. Each input signal on lines 511 is provided to its respective latching register 52 which holds the signal appearing at its input line 511 at the time that latch pulses 531, 532 are provided. The timing of the latch pulses 531 532 relative to latch pulse 42 and shift frequency 43 is such that the signals being stored in latches 52 are those which were produced by the transducers centered about an azimuthal position nearly coincident with the azimuthal direction of the beam 17 which is desired to be produced. The output of each latch 52 is provided to a multiplying digital-to-analog converter 54 which multiplies the linear signal stored in latch 52 by a controller 318 provided digital shading factor 541 of the appropriate amount to produce a beam having acceptable side lobe levels. This technique of shading or weighting of signals provided by transducers to provide a beam of reduced side lobe levels is well-known in the beamforming art. Because the elliptical aperture of transducer elements 13 being utilized to form the beam is moved over the surface of spherical assembly 14 in order to provide different beam directions, a given row of elements 13 may have less than twelve of the elements of the row included in the array forming the beam. When a row occurs near the top or bottom of the elliptical array, significantly less than twelve elements fall within the ellipse and the selection of the elements is accomplished by multiplying the endmost cells' signals 51 by zero in converter 54. Each converter 54 is provided with its individual weighting factor on its input line 55. Because of the symmetry of the left and right half beams, equal weighting factors are applied to the multiplying analog-to-digital converters which are symmetrical with respect to the mirror image line 56 which is the dividing line between the transducer elements 13, which are summed to provide the left half beam, and those which are summed to provide the right half beam. Thus, the first multiplying digital-to-analog (MDAC) converter 54' has the same multiplying or shading factor 55' as the shading factor 55" of the last (or twelfth) converter 54", and so on. The shaded outputs 57 of the multiplying digital-to-analog converters 54 are provided to shift registers 58, each having the number of stages required to satisfy the equation presented subsequently in order to produce the required delay for each of the transducer signals to produce a linear phase front appropriate to form the beam as is well-known in the art. The different number of stages in the shift registers 58 is depicted by the different length of the registers 58 in FIG. 5. The number of stages N in each register 58 and the shift frequency $f_s$ on line 581 determines the delay in each register 58. Because of the symmetry relation expressed earlier between the left and right half beams, the number N of stages of registers 58, $N_1=N_{12}$, $N_2=N_{11}$, etc. For a beam having a direction in a plane of the rows of the transducers, the fixed geometric relationship of the transducers on a circle of the sphere determines the difference in the number of stages of delay for a fixed shift frequency 331. Each row has its own set of registers 58 with the number of stages N of each register chosen to provide the correct delay to provide a linear phase front. For azimuth beamforming, the sampling rate of latch pulse 42, latch pulses 531, and shift frequency 331 are equal and are controlled by computer 100 in accordance with row geometry and depression/elevation angle. The number of stages N in corresponding shift registers 58 of beamformers 33 are equal for beamformer 33 connected to rows having the same number of transducer elements 13, however, the shift frequency 331 is different for each row in order to produce the desired delays for different rows. The shift frequency 331 of each row is also determined by the depression/elevation angle ∅ of the target in accordance with the equation given below. The shift frequency 331 (and hence the number of stages N of register 58 to get a prescribed time delay for each transducer connected to the beamformer 33) is determined by the geometry of the array and by the resolution in time required to obtain the desired main lobe response and side lobe suppression, since the physical size of the circle of a row of transducers changes with latitude, for the case of the same number of cells in the registers of the beamformers connected to rows having an equal number of transducers, the shift frequency 331 must be higher for the smaller diameter rows. The shift registers 58, $N_1$ through $N_6$, have their outputs connected to the summing circuit 59' which provides the left half beam signal 382. The six shift registers 58, $N_7$ through $N_{12}$ which are connected to the cells 87–91 of shift register 41 have their outputs connected to the summing circuit 59" to provide the right half beam signal 383.

For a symmetric aperture 28, the delay required a particular transducer element in a row beamformer is:

$$T_j = R_i \cos \phi [\cos(\theta - (j-1)\varphi) - \cos \theta] / V_c$$

where $R_i$ is the radius of the $i^{th}$ row measured from the polar axis 29 of sphere 12, $V_c$ is the sound velocity, θ is half the included angle between the outermost transducers lying within the aperture contained in the row being beamformed, $T_j$ is the time delay for the $j^{th}$ transducer of the row in the aperture relative to the aperture edge, is the angular spacing between transducers in the plane of the row, ∅ is the depression/elevation angle. It is noted in the above equation that for a signal not arriving in the plane of the row, the time delay required for each transducer includes multiplication by cos ∅, where ∅ is the depression/elevation angle of the signal source 18 measured from a plane parallel to the rows of the transducers, as shown in FIG. 1. The number of stages N in each shift register 58 is given by $N_j=T_j f_s$ and is determined at ∅=0 and $f_s$ is the desired shift frequency, changes in time delay line required for ∅≠0 are achieved by changing the value of $f_s$.

Referring again to FIG. 4, storage cells 81–91 (also cells 1–12) of shift register 32 are connected to transducers 1–12, respectively. Beamformers 33', 33" are connected to cells 80–91 since the transducer signals stored in cells 81–91 depend upon the number of shift pulses 43 between the time of occurrence of the latch pulse 42, the time of occurrence of the latch pulses 531, 532 determine which transducer signals stored in cells 81–91 provide the longitudinal directions of the beams formed by beamformers 33' and 33". The latch pulse 531 applied to beamformer 33' is either one period of shift frequency 43 ahead of or behind shift pulse 532 applied to beamformer 33" so that the group of twelve transducer signals applied to beamformer 33' differs by one from the group of twelve transducer signals applied to beamformer 33". For the case where there are eighty transducers in a ring, the beams formed by beamformers 33' and 33" will be at an angle of 360/80 or 4.5° with respect to each other. Thus, the time delay of the beamformer latch pulse 53, relative to latch pulse 42 for a fixed shift frequency 43 determines the azimuthal directions of the beams formed by the beamformers 33' and 33".

The storage registers 32', 32" connected to transducer rows having sixty or forty transducers, respectively, will be connected to their respective beamformers 33 in the same manner as the eighty transducer row as described above. FIG. 4 shows the arrangement for transducer row $T_7$ which has sixty transducers $TR_1$–$TR_{60}$. For the rows having sixty transducers, cells 1–60 and 61–71 are connected to transducers $TR_1$–$TR_{60}$ and $TR_1$–$TR_{11}$, respectively. Beamformers 33''' and 33'''' are connected to register 32' cells 60–71.

The latch pulse 42 for all the shift registers 32 is the same regardless of whether the row to which they are connected has forty, sixty, or eighty transducers. The transducers $TR_1$ of every row are at the same azimuthal position on the sphere 14. Since the data from transducers of different rows but of the same azimuthal position are to be provided to their respective row beamformers 33 at the same time, the shift frequency 43' of the shift registers 32' connected to the sixty transducer rows is only three-fourths the shift frequency 43 applied to the shift registers 32 connected to the eighty transducers rows. Similarly, the shift frequency 43" of registers 32" connected to the rows having forty transducers is only one-half the shift frequency applied to the registers 32 connected to the eighty transducer rows. Therefore, because the shift frequencies are proportional to the number of transducers in a row, the information stored in the cells of each shift register 32 connected to their respective transducers at corresponding azimuths of sphere 14, will be provided synchronously to their respective beamformers 33. Therefore, the beams formed by each row of transducers are all directed in the same longitudinal direction.

Shift frequencies 43 and latch pulse 42 are provided by the beamformer controller 318. The shift frequencies 43 necessary to compensate for the time delay change between transducer elements of a row because of the depression/ elevation angle of the target are generated by computer 100 acting upon the up/down error signal 702 in the same manner as described later for the generation of the interpolation factor A.

As stated earlier, the beamformers 33 are used in pairs 33', 33", as shown for row B4 in FIG. 4, one pair for each shift register 32 connected to its corresponding row of transducers. For transducer row B4, the beamformers 33', 33" are connected to the twelve adjacent stages 80–91 of the shift register 32. Each beamformer 33 provides a left and right half beam, each half beam directed in the same direction. However, the left half (and right half) beams from the beamformers 33', 33" have beam directions which are different by the included angle of two adjacent transducers, which for the eighty transducer row $B_1$ is 4.5 degrees because of the time 10 difference between latch pulses 53', 53" of one period of shift frequency 43.

In order to smoothly track between the two beam directions provided by beamformers 33', 33", interpolation of the two adjacent beams is required. The left half beam output signal 340 of the beamformer 33' is multiplied in multiplier 3501 by a numerical factor A, $0 \leq A \leq 1$. The left half beam signal on line 360 of the beamformer 33" is applied to multiplier 3502 where it is multiplied by (1–A), where the A is the same value as the multiplying factor applied to multiplier 3501. The outputs of the multipliers 3501, 3502 are applied to the summer 380' whose output on line 382 is the interpolated output of two adjacent left half beams. The signal 382 is applied to a bandpass filter 35 of FIG. 6 having a pass band to filter out the sample or latch frequency 44, typically 30 KHz to 50 KHz, and its harmonics of the beamformer unit 40 and to eliminate low frequency noise components and thereby reconstruct the signal to an unsampled form to permit subsequent resampling in column beamformer 50.

Similarly, the right half beam signal 341 of the beamformer 33' is multiplied by the shading factor A in multiplier 3503. The right half beam signal on line 361 of the beamformer 33" is multiplied by the shading factor (1–A) in multiplier 3504. The outputs of the multipliers 3503, 3504 are added in summing circuit 380" whose output line 383 is filtered in filter 35" of FIG. 6 to provide the interpolated right half beam.

The value of the interpolation factor A and (1–A) is provided by the beamformer controller 318. Interpolation of two adjacent beams provides a smooth transition between beams as a target moves in azimuth relative to the beams. As an example of the operation of this interpolation beamformer, it will be assumed initially that the target is midway between the left half beams of the beams formed by beamformers 33', 33". In this instance, the value of A should be one/half and the value of (1–A) would be one/half and, hence, the signal contributions from the beamformer 33', 33" would be equal. As the target moves from the main response axis (MRA) of the beam formed by beamformer 33' toward the MRA of the beam formed by beamformer 33", the value of A decreases until it ultimately becomes zero, at which time the target is centered on the MRA of the beamformer 33", and beamformer 33' is making no contribution to summers 380' and 380". The controller 318 will sense when the signal A has decreased to zero will cause the time of occurrence of the latch pulse 531 to be delayed by two periods of the shift frequency 43 so that the transducer signals latched into beamformer 33' are the sampled signals of transducers whose MRA is on the other side of the MRA of the beam formed by beamformer 33". As an example, assume initially that the timing of latch pulse 531 is delayed one period of the shift frequency 43 with respect to latch pulse 532 and occurs when the sampled inputs of transducers 11–24 have been shifted into cells 80–91 and latched into beamformer 33'. Beamformer 33" will have the signals of transducers 12–25 latched into it by latch pulse 532. If the target signal moves in azimuth from the MRA of the beam formed by beamformer 33' to the MRA formed by beamformer 33", A will become zero and the beam formed from transducers 11–24 is contributing no signal to summers 380', 380". A transfer of the inputs of beamformer 33' to transducers 13–26 will produce no perturbation in the output signals on lines 382, 383 since A will still be zero. The transfer to transducers 13–26 is accomplished by advancing the timing of the latch pulse 53' by two pulses of the shift frequency 43, associated with the register 32. If the target signal continues to move in the same longitudinal direction, then the value of A will increase to unity and therefore the output signal of beamformer 33" being multiplied by 1–A will become zero. At that time beamformer 33" is switched, the 20 sampled signals of transducers 14–27 by advancing the timing of the latch pulse 532 by two periods of the shift frequency 43. This process of beam switching by alternatively advancing (or delaying for target signal movement in the reverse azimuthal direction) the times of occurrence of the latch pulses 531, 532 continues until the end cell of the register 32 is reached at which time both latch pulses 531, 532 are incremented or decremented by the period of latch pulse 42 so that the same transducers are being sampled but at one period later in time. Thus, the transducer signals have been delayed by the appropriate amount by transfer through the cells of register 32 by shift frequency 43. Thus, it is seen that the interpolation process produces no abrupt transition as the beamformers 33' and 33" sample different transducer output signals from the storage register 32 while tracking a target in azimuth.

The interpolation multiplying factors A and 1−A are provided by beamformer controller 318 as a result of control signals provided by computer 100. The computer 100 has the azimuth control signal 319 provided as an input 62 from the manual control 311 or the input 701 from azimuth angle error detecting circuit 700'. The computer 100 in response to a right/left input control signal causes controller 318 to incrementally change A and decrement (1−A). If the computer senses that the error signal 701 has decreased as a result of the incremental change in A and 1−A, the computer continues to increment A and decrement 1−A until it senses that the error signal 701 has become zero. If, at a later time, the error signal 701 exceeds a positive or negative threshold as a result of relative azimuthal movement of the target and beam, the computer will make the necessary changes in A and 1−A to keep the MRA of the interpolated beam centered on the target.

When the computer 100 in conjunction with the controller 318 senses that either A or 1−A has become zero, the computer 100 causes either the latch pulse 531 or 532 to advance or be retarded by two periods of shift frequency 43, as explained in this specification, to advance or retard the transducers to which one of the beamformers 33', 33" is connected in order to track a target.

Although analysis has shown that linear interpolation results in negligible steering errors, the invention does not depend on linear interpolation. To the contrary, the invention provides the freedom to adopt any interpolation function desired if warranted by system performance requirements.

Referring now to FIG. 6, there is shown the the dual split-beam depression/elevation beamformers 50, each beamformer comprising bandpass filters 35, shift registers 36, bandpass filters 37, and quadrant gating circuits and summing amplifiers 38 which are comprised of multiplying digital-to-analog converter 39, switches 41 and summing circuit 56–59. The outputs 382, 383 of the vertical fan-shaped left and right half beamformer 40, respectively, of each of the transducer rows ($T_7$–$B_{12}$) are provided as inputs to the beamformers 50 which track the target signal in the depression/elevation angle relative to the plane of the rows. For example, the left half beam signals 382 from the rows $T_7$–$B_9$ after processing in beamformer 50' are selectively provided as inputs to summing circuit 56 whose output is the upper left half quadrant beam signal 561. The processing circuitry comprises bandpass filters 35 which filter out the frequency components produced by the sampling effects which occur in beamformers 33', 33" because of the latch frequency 42 and shift frequency 331 used in the formation of the beams. The bandpass filters 35 are important because by filtering the sampled data contained in signals 381, 382, they reconstruct the signals to their original unsampled form and thereby allow the subsequent resampling of the filtered signals 381, 382 in shift registers 36 at arbitrary rates 361 differing from the original sample rate 42 free from artifacts.

Each bandpass filter 35 provides the input to a shift register 36 which has a shift frequency 361 provided by controller 318. The number of stages in each shift register 36 is equal for each row, and therefore the shift frequency 531 applied to the shift register 36 determines the time delay experienced by the signal applied to the input of the shift register. The delays required for the signals 382, 383 of each row of transducers within the array 28 to provide a linear phase front process is provided by applying the appropriate shift frequency 361 to each shift register 36 from controller 318 as is well-known to those skilled in the art of beamforming. Since only six rows of transducers 28 are within the aperture, the controller 318 need only provide shift frequencies 531 to those six rows. Because the rows are on the surface of a sphere, the signal delay (and hence shift frequency) for each row depends upon the desired direction of the beam. Therefore, the time delay of a given row is conveniently changed by changing its shift frequency 361 as provided by the controller 318 as controlled by computer 100 which is responsive to the up/down error signal 700 and its internally generated incremental changes operating in the same manner as was used to track in azimuth when using the left/right error signal 701. Since beam direction is also changed by changing the rows constituting a group of six rows by controlling the amplitude of the signal 391 applied to multiplying digital/analog converters 39 by controller 318, it is apparent that the same range of shift frequencies may be used in different groups of adjacent rows of transducers to obtain beam steering over a large depression/elevation angle.

The output of each shift register 36 is applied to its corresponding bandpass filter 37 which filters out the shift frequency 361 applied to shift registers 36. A multiplying analog-to-digital converter 39 has one input connected to the output of the bandpass filter 37 and its other input to a weighting signal 391 provided by controller 318. The weighting signals 391 select rows and reduce sidelobe levels of the formed beams as is well-known to those skilled in the art. The outputs of the multiplying analog-to-digital converters 39 are selectively applied through switches 41 as inputs to summing circuits 56, 57 of beamformer 50' whose outputs provide the upper left and lower left quadrant beam signals 561, 571, respectively. Switches 41 are controlled by control signals 411 from controller 318 to provide row output signals to either summing circuit 56 or 57. Similarly, beamformer 50" to which the right half beam signals 383 are applied has corresponding shift frequencies 361 applied to corresponding row registers 36, multiplying factors 391 and switching signals 411 as were applied to beamformer 50'. The summing circuits 58, 59 of beamformer 50" therefore provide the upper and lower right half beam signals 581, 591, respectively. Also provided is the output 601 of a summing circuit 60 which has as its inputs the signal outputs 561, 571, 581, 591 from all of the quadrants of the beams. The sum output signal 601 is useful for data analysis, spectrum analysis and acoustic listening.

The beamformer 50' processes the left half beam signals 382 into an upper left half beam signal 561 and a lower left half beam signal 571 by utilizing control signals 361, 391 and 411 from the beamforming controller 318. If it is assumed, for example, that the array aperture 28 is located as shown in FIG. 2 to provide quadrant beams centered on target 18 of FIG. 1, rows $B_2$–$B_4$ are combined to form the upper left half beam and rows $B_5$–$B_7$ are combined to form the lower left half beam. It is observed that for the assumed elliptical aperture shown in FIG. 2 where only six rows fall within the aperture, that the lowermost rows $B_{10}$, $B_{11}$ and $B_{12}$ are never in the upper half beam and the uppermost rows $T_5$, $T_6$ and $T_7$ are never in the lower half beam. The other rows $B_9$–$T_4$ may be either in the upper half beam or the lower half beam depending upon the depression/elevation angle of the beams. Therefore, each half beam signal $B_9$–$T_4$ is provided to its respective switch 41 before being summed in either summing circuit 56 or 57 depending upon whether the signal of the row under consideration is in the upper or lower half beam. For the aperture position shown in FIG. 2, the switches 41 are energized by a signal 411 from controller 318 to cause row signals $T_7$–$B_4$ to be switched into the upper half beam summing circuit 56 whereas row signals $B_5$–$B_{12}$ are caused to be switched into lower half beam summer 57 by a signal 411' on switches 41'. Since only six rows $B_2$–$B_7$ are shown within the aperture, the controller also provides a "zero" multiplying factor 391 to the multiplying digital/analog converters 39 in the channels of each of rows $T_7$–$B_1$ and $B_8$–$B_{12}$. For the channels connected to rows $B_2$–$B_7$, the controller 318 provides signals 391 which are the appropriate weighting factors for forming the beam in the vertical plane as is well-known to those skilled in the art of beamforming. This row selection becomes necessary since it is observed that the elliptical aperture 28 encompasses only six rows whereas the number of rows connected to the beamformer 50 contains nineteen rows. The weighting signals 391, the shift frequencies 531 and switching signals 411 are provided by beamformer controller 318 and computer 100 which is responsive to the up/down error signal 702 from the tracker circuitry 700 of FIG. 7 which indicates the direction to which the beam produced by the column beamformers 50 should be directed.

Figure 7:
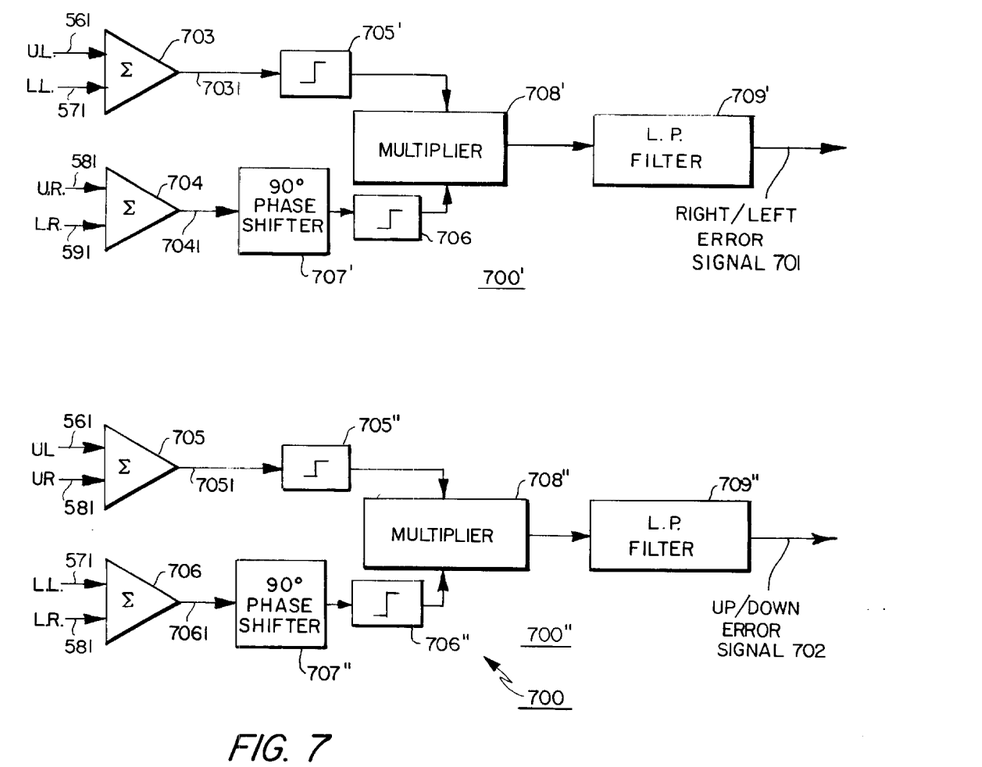
FIG. 7 is a block diagram of circuitry for producing up/down and left/right error signals.

Referring now to FIG. 7, there are shown angle-error detecting circuits 700 which provide the right/left error signal 701 and the up/down error signal 702 from the appropriate combinations of the quadrant beam signals 561, 571, 581 and 591. The right/left error signal 701 is obtained by combining the upper left 581 and lower left 571 quadrant beam signals in summing circuit 703 of error detecting circuit 700' to produce a left half beam signal 7031. Similarly, the right half beam signal 7041 is obtained by summing the upper and lower right quadrant beam signals 581, 591 in summing circuit 704. The right/left error signal 701 is obtained from signals 7031, 7041 by applying one of the signals 7041 to a 90° phase shifter 707' prior to applying signals 7031, 7042 clipped in limiters 705', 706', respectively, to a multiplier 708' whose output is applied to filter 709' which provides the right/left error signal 701 at its output.

Similarly, the up/down error signal 702 is obtained by combining the upper left and right quadrant signals 561, 581 in summing circuit 705 to get the upper half signal 7051, combining lower left and right quadrant signals 571, 591 in summing circuit 706 to get lower half signal 7061, and processing these signals in the remainder of error detecting circuit 700" comprising phase shifter 707", limiters 705", 706", multiplier 708" and low pass filter 709" as for the right/left error signal 701.

Figure 8:
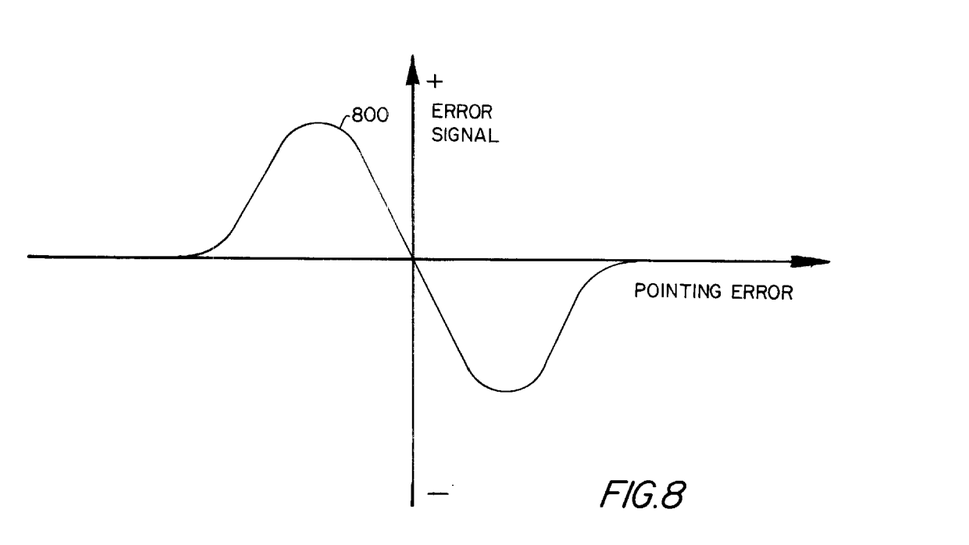
FIG. 8 is a graph of the error signal as a function of beam pointing error.

FIG. 8 shows a representative error signal waveform 800 for error signals 701, 702 as a function of the pointing error of the main response axis 17 of the beam 16 relative to the signal provided by target 18 of FIG. 1. The positive or negative components of error signals 701, 702 from the angle-error detection circuits 700 are provided to a bearing direction indicator 39 for a visual indication of the bearing and elevation error signals 701, 702. An operator of the tracking system 30 of FIG. 3 may provide signals to computer 100 from manual control 311 so that the computer will provide the necessary signals to beamformer controller 318 which provides the control signals for forming the left and right half beam signals 382, 383 (latch pulses 531, 532) and the control signals for forming the quadrant beams 561, 571, 581, 591 (shift frequencies 361, shading factors 391, and switch control pulses 411). In addition, the computer 100 is responsive to the azimuth error signal 701 to control the time of occurrence of latch pulses 531, 532 as explained earlier.

In the automatic tracking mode as selected by switch 3111, the computer 100 is directly responsive to the error signals 701, 702 to produce the above-described control signals.

The azimuthal beamforming system 40 of FIG. 4 shows one form of register 32 which is used to sample the transducers 13 in a row and to transfer the sampled signals to the beamformers 33', 33" to form two beams having MRA's which have angular spacing equal to that of their transducer angular spacing.

FIG. 7(a) shows another form of shift register where the output of the last stage (80) of the register is connected to the input stage (1) to form a circulating information register 321. The beamformers 33 are connected to a group of adjacent cells 411 of register 321. The shift frequency 431 must be sufficiently high that the information latched into cells 411 of register 321 connected to beamformers 33 are shifted through the register 321 and back to the beamformers 33 before the occurrence of the next latch pulse 42. The shift frequency 431 is therefore maximally equal to the latch pulse frequency 42 multiplied by the eighty cells 411 in the storage register 321 connected to eighty transducers.

In order to reduce the rate of the shift frequency 43 and in turn the performance requirements of the shift register, the shift register may be divided into shorter shift registers 322 each of, for example, twenty memory cells as shown in FIG. 7(b). Each register 322 is latched in parallel to a transducer group by latch frequency 42 and serially shifted out at different times by its shift frequency 432 which is only one-half that required for the eighty cell register 32. By way of illustration, assume that the beam is to be formed from the signals of transducers 31–50. A signal from controller 318 causes switch control unit 708 to connect the arm of switch 710 to the output of register 324 which contains the stored signals from transducers 41–50. At the same time, the controller signal actuates shift frequency control 709 to provide shift pulses 432 to register 324 which serially reads out the stored signals in register cells 60–41 in that order. At the time that the signal in cell 50 appears at the output of register 324, the switch 711 closes in response to a signal from controller 318 to thereby serially shift into register 712 the signals from cells 50–41. After the signal in cell 41 has been shifted into register 712, switch 710 is connected to the output of register 323 and shift pulses 433 are provided to serially provide the signals from cells 40–21 at the output of register 323. After the signals from cells 40–31 are fed into register 712, switch 711 opens thereby preventing further transfer of signals into register 712. At the same time, the shift clock to register 712 is inhibited to halt the shifting of data 712 and the data content of 712 is downloaded into beamformers 33' and 33" which are shifting and storing the signals from transducers 31–50. The occurrence of the next latch pulse 42 will cause fresh information to be stored in register 712. At every sample pulse 42 the data in the beamformer is shifted down one step and new information is entered at the top half beam sums appear therefor at the output at the same rate as the transducer elements are being sampled. The switch 713 closes either one period of the shift frequency earlier or later than switch 711 to thereby store in register 714 signals which, when processed in beamformer 33", provide the right and left half beam signals of the beam adjacent to that provided by beamformer 33'.

Figure 9A:
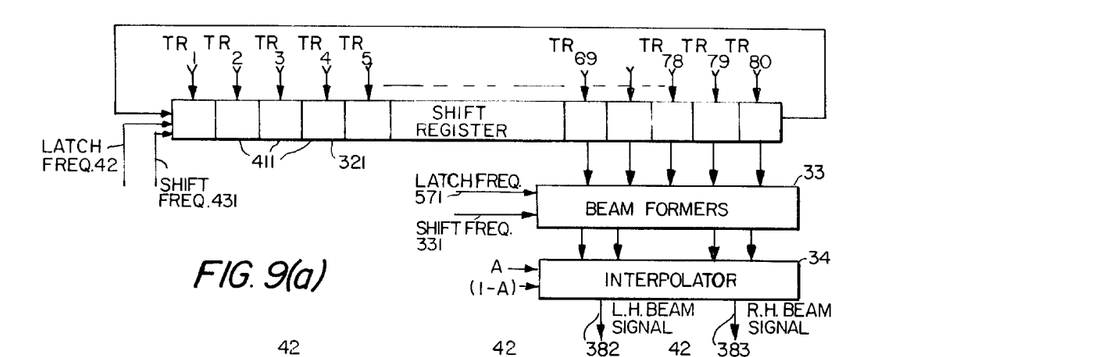
FIGS. 9(a) and 9(b) are block diagrams of alternate forms of right and left half beamforming circuits.
Figure 9B:
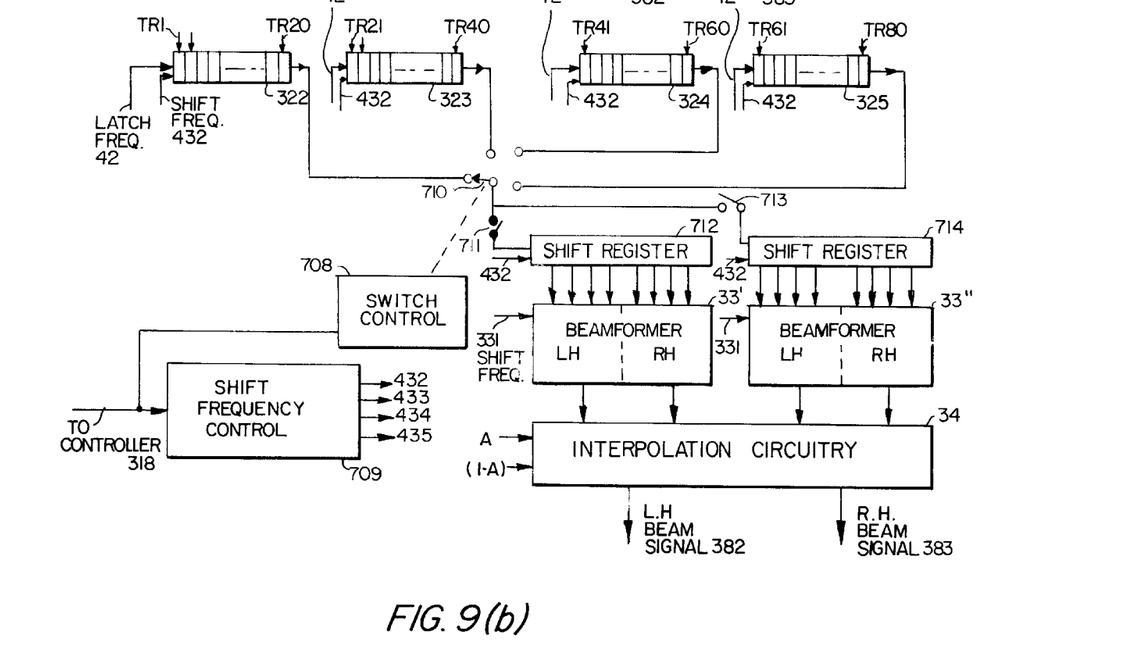
Figure 9C:
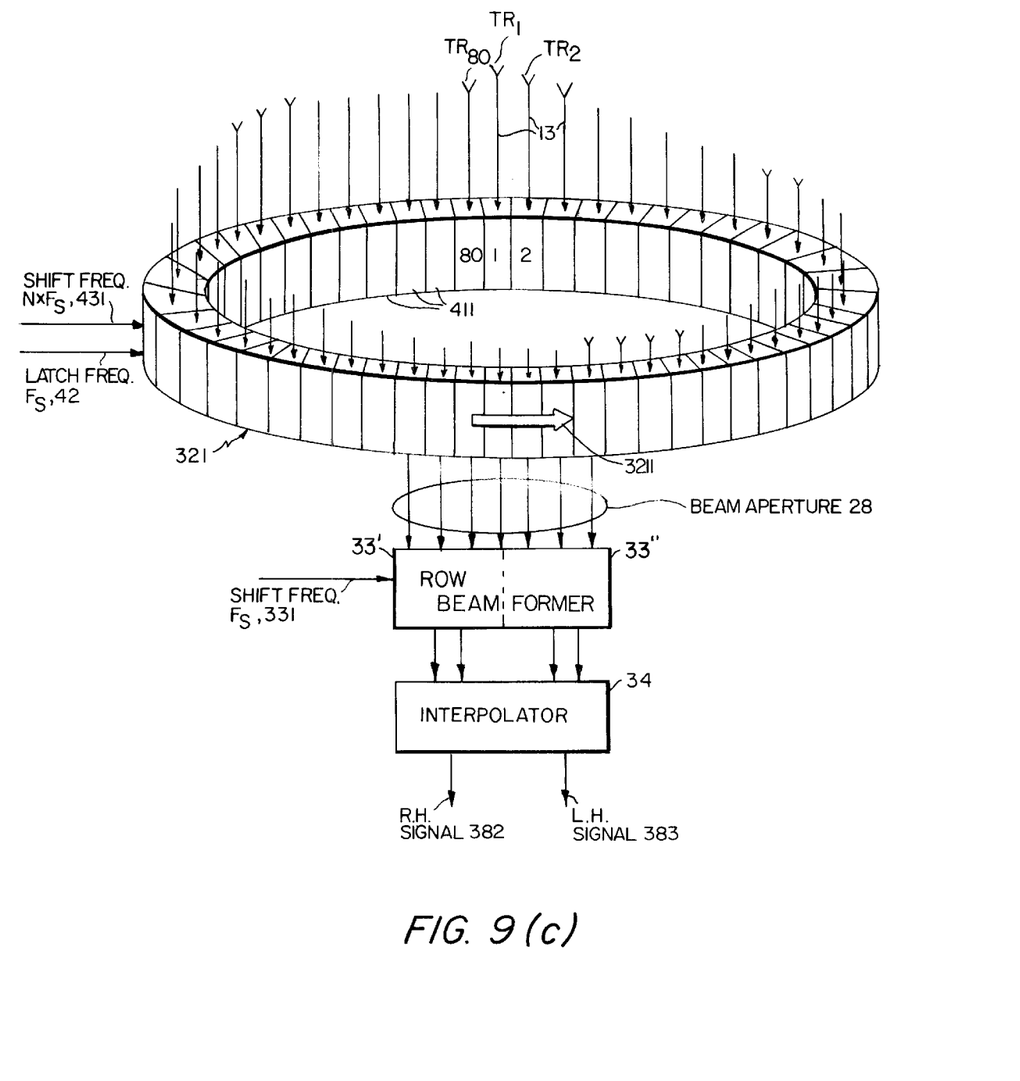
FIG. 9(c) is a pictorial representation of a recirculating shift register to produce commutating to a beamformer.

FIG. 9(c) is a pictorial representation of a circular row of transducer elements 13, each connected to a memory cell 411 of the circulating register 321 of FIG. 7(a). The latch frequency 42, shown in FIG. 9(c) as frequency $F_s$, samples and stores the signals of the transducers in the cells to which they are connected. The stored information is shifted around the register 321 which is depicted as a closed ring. The direction arrow 3211 shows the direction of information shift. The shift frequency 431 is at the frequency $Nf_s$ where N is a member at least equal to the number of cells 411 in register 321. The latch pulse frequency and the shift frequency of beamformer 33 are shown as one frequency 331 since shifting through the beamformer 33 is at the same rate as information is latched into it from cells 411. The beamformer 33 shown in FIG. 9(c) is actually two beamformers 33', 33" together with the interpolation circuitry 34 of FIG. 4 resulting in the interpolated left half 382 and right half 383 beam signals.

It should be noted that beamformers 33', 33" need not be connected to the same cells 411 of register 32 or 321 as shown in FIGS. 4 and 9(c) in order to produce adjacent beam signals from a transducer row. This is so because the information transferred to each beamformer 33', 33" is dependent on the time at which the latch pulses 531, 532 are applied to the respective beamformers since the information in each cell 411 of register 32 changes with time because information is being transferred from cell to cell at the shift frequency 43, 431.

In summary, the invention described herein provides individual beams for each row of transducer elements which are formed with absolute accuracy in azimuth equivalent to training two prior-art mechanical comparator types of beamformers in fixed increments which are one increment apart and steering by interpolation to MRA positions intermediate the MRA's of the trained beams. In the depression/elevation plane perfect training is obtained with the prior-art comparator only over the region where full aperture can be maintained. At large depression/elevation angles where full aperture is no longer possible, depression/elevation steering replaces depression/elevation training in this invention.

Figure 10:
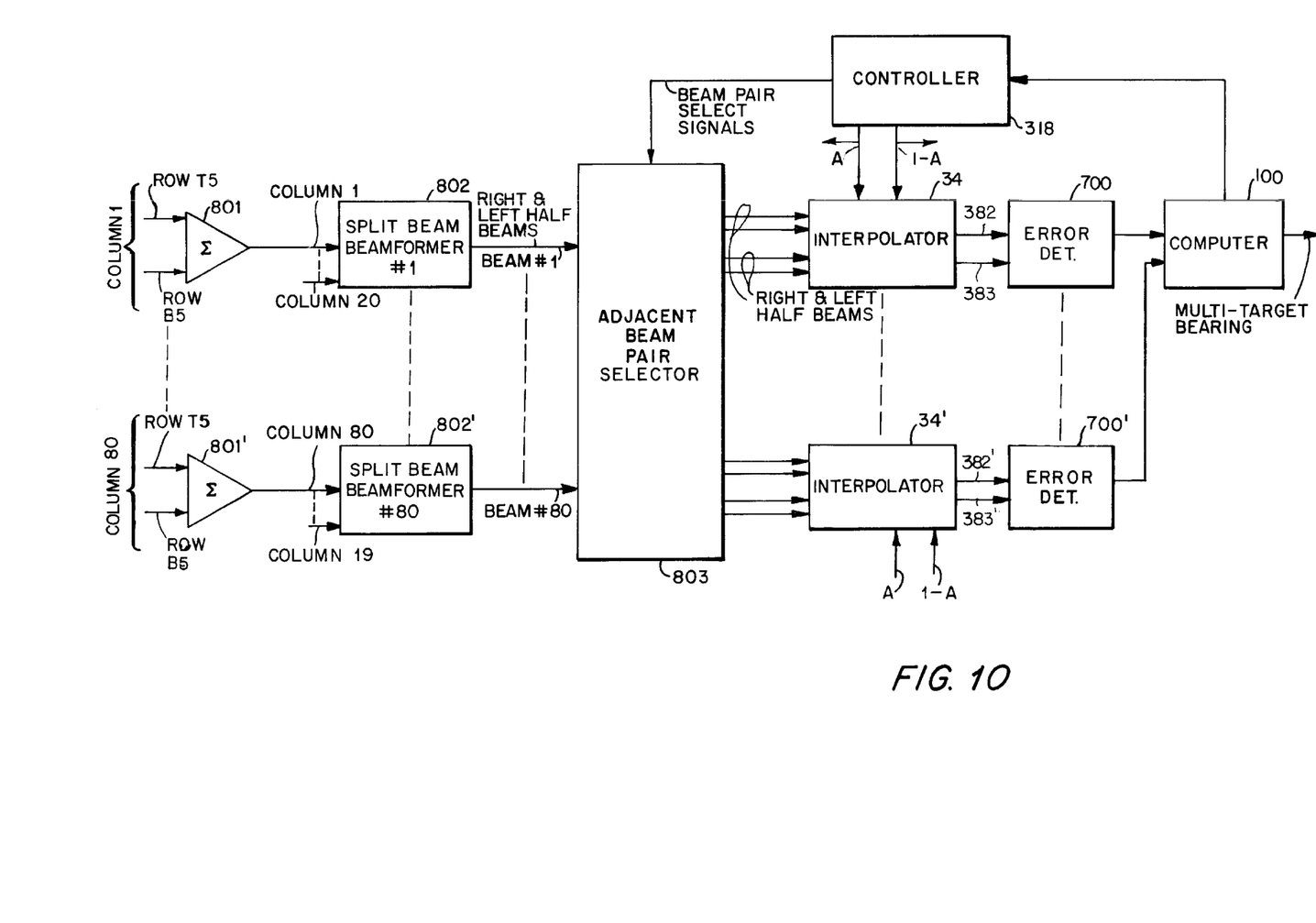
FIG. 10 is a block diagram of a multitarget search and track beamforming system.

A multitarget detection and tracking system 800 can be implemented as shown in FIG. 10 by, for example, summing in summers 801 all transducer elements in eighty-transducer rows T5 to B5 which are in the same column in order to provide eighty summed signals. The column outputs of each of a predetermined number (twenty, for example) of adjacent columns are provided as inputs to each of eighty azimuth left-and right-half beamformers 802. Each beamformer 802 provides a vertical fan-shaped beam having a direction normal to the sphere of transducers at the center column of the selected columns and directed at an angle of 4.5° with respect to its adjacent beam. Pairs of adjacent beams are selected in selector 803 and provided to one or more interpolators 804 for tracking as many multiple targets in azimuth only. The output of each interpolator 33 provides a left and right half beam signal which are phase detected as in circuits 700 to provide a left/right error signal in the same manner as described earlier to provide the interpolation factors A and 1−A and for each pair of adjacent beams. The error signal is provided to computer 100 which functions to select each pair of adjacent beams which are "on" each of the target signal sources.

Having described a preferred embodiment of the invention, it will now be apparent to one of skill in the art that other embodiments incorporating its concept may be used. It is felt, therefore, that this invention should not be restricted to the disclosed embodiment, but rather should be limited only by the spirit and scope of the appended claims.

What is claimed is:

1. A sonar tracking system for tracking the signal provided by a signal source comprising:

a plurality of transducers arranged in a plurality of circular rows, each transducer adapted to receive a signal from a signal source, and each transducer of a row being spaced from its adjacent transducer by an included angle measured from the center of said circular row;

a row beamforming means combining the output of selected adjacent transducers in a row for providing a pair of beams, each pair providing a left-half and a right-half beam signal having main response axes in predetermined azimuthal directions and a declination/elevation direction, said azimuthal directions differing in angle by the included angle of the transducers of the row;

interpolating means connected to the output of said row beamforming means for combining the left half beam signal and the right-half beam signal in response to the signal from said source to provide an interpolated beam providing an interpolated right- and left-half beam signal with its main response axis centered on said signal source;

a plurality of said row beamforming means and its associated said interpolating means, each said row beamforming means and said associated interpolating means connected to selected adjacent transducers of one of said plurality of adjacent rows;

a column beamforming means comprising a first and second column beamforming means;

said first column beamforming means responsive to the interpolated right half beam signals of selected rows of transducers to form upper- and lower-right half beam signals;

said second column beamforming means responsive to the interpolated left half beam signals of selected rows of transducers to form upper- and lower-left half beam signals;

said upper- and lower-right and left half beams forming quadrant beams having a main response axis; and means responsive to said upper and lower right and left half beam signals to provide error signals indicative of the angular direction by which said main response axis is to the right or left and up or down from said signal source.

2. The sonar tracking system of claim 1 comprising in addition:

means responsive to said error signal to cause the main response axis of said quadrant beams to be centered on said signal source.

3. The sonar tracking system of claim 1 wherein said row beamforming means comprises:

a first shift register having a plurality of serially connected cells, each cell also connected to at least one corresponding transducer of one of said rows;

first pulse means for periodically providing a first pulse for latching each said transducers' output signals into said corresponding cell of said first shift register;

first shift frequency means serially shifting said latch signals through said serially connected cells of said first shift register;

a first and second beamformer means, each connected to a predetermined first and second plurality of adjacent said cells respectively of said first shift register;

second pulse means for providing a second pulses for latching into said first beamformer means signals from a first predetermined group of adjacent transducers stored at the time of occurrence of said second pulse in the cells connected to said first beamformer;

third pulse means for providing a third pulse for latching into said second beamformer means signals from a second predetermined group of adjacent transducers stored at the time of occurrence of said third pulse in the cells connected to said second beamformer;

said first and second predetermined groups of adjacent transducers being different overlapping groups;

said second and third pulses having the same frequency as said first pulse, said second and third pulses having a predetermined time relation with respect to said first pulse; and said first and second beamformer means each providing right and left half beam signals from transducer signals obtained from said first and second transducer groups, respectively.

4. The sonar tracking system of claim 3 wherein each of said first and second beamformer means comprises:

a plurality of second shift registers, each connected to a different cell of said first shift register;

said second and third pulses latching said transducer signals into said second shift register of said first and second beamformer means, respectively;

a second shift frequency means having a frequency equal to the frequency of said first pulse means to shift through said second shift registers the signal latched into said second shift registers by said second and third pulse means;

the number of stages in each second shift register being determined by the geometry of the transducers to cause said latched input signals to said second shift registers to be in-phase at the outputs of said second shift registers;

said plurality of second shift registers forming a first and second group of second shift registers, each group being connected to one of the two adjacent plurality of cells of either said first and second plurality of cells; and means for summing the outputs of the second shift registers of each of said adjacent plurality of cells to provide at the output of said summing means the right and left half beam signals formed by each group of said plurality of second shift registers.

5. The sonar tracking system of claim 1 wherein said first interpolating means comprises:

a plurality of multiplying means;

a source of first and second multiplying factors;

a first summing circuit;

one of said left half beam signals of one of said pairs of beams being multiplied in said multiplying means by a first multiplying factor from said source, the other of said left half beam signals of the other of said pair of beams being multiplied in said multiplying means by said second multiplying factor from said source;

said first summing circuit being connected to said multiplying means to sum said multiplied left half beam signals to form an interpolated left half beam signal;

a second summing circuit;

one of said right half beam signals of one of said pair of beams being multiplied in said multiplying means by said first multiplying factor from said source, the other of said right half beam signals of the other of said pair of beams being multiplied in said multiplying means by said second multiplying factor from said source;

said second summing circuit being connected to said multiplying means to sum said multiplied right half beam signals to form an interpolated right half beam signal;

a computer controlled beamformer controller; and said source of multiplying factors being coupled by said controller to said means for providing left/right error signals to provide said first and second multiplying factors which provide interpolated right and left half beam signals to said means for providing left/right error signals.

6. The sonar tracking system of claim 3 wherein said column beamforming means comprises:

filtering means comprising a first plurality of filters;

said right and left half beam signals from each of said rows being filtered in said filtering means to remove from said half beam signals the effects of latching and shifting of said signals in the shift registers of said row beamformers means;

each of either of said first and second column beamforming means comprising:

a plurality of channels, each channel being connected to one of either the right and left half beam signals of a different row;

each channel comprising one of said first plurality of filters;

a column shift register connected to the output of said first filter;

means for providing a different shift frequency to each channel shift register;

a second band pass filter connected to the output of said column shift register for removing the effects of shifting the half beam signal through said column shift register;

means multiplying the output of each second band pass filter;

a plurality of summing circuits; and means for selectively summing the multiplied output of each second band pass filter in each of said summing circuits to provide an upper and lower half beam signal for one of either the right and left half beam signals, said first and second column beamforming means providing quadrant beam output signals from the outputs of said summing circuits.

7. The sonar tracking system of claim 1 wherein:

said means responsive to said upper and lower right and left half beam signals to provide up/down and left/right error signals comprises:

means for summing said quadrant signals to obtain a pair of right and left half signals and a pair of upper half and lower half signals; and means for determining the relative phase of each half signal of each pair to provide an output signal for each pair indicative of the location of the signal source with respect to the main response axis upon which said quadrant beam signals are centered.

8. A sonar tracking system comprising:

a plurality of transducers arranged in circular rows on the surface of a sphere, each transducer adapted to receive a signal from a signal source, and each transducer of a row being spaced from its adjacent transducer by an included angle measured from the center of said circular row;

a plurality of storage registers, each having its stages connected to the transducers of a different row for storing, in parallel, the transducer signal output at predetermined times;

means for shifting the signal stored in each said register in a serial manner;

gating means connected to predetermined adjacent stages of said register for transferring, in parallel, the information stored in selected ones of said stages to a pair of beamforming circuits;

said beamforming circuits providing a pair of beams, each beam having a left and right half beam, said beams of said pair having main response axes which are angled with respect to each other by the included angle between adjacent transducers in the row of transducers to which the storage register is connected;

means for interpolating said left half beams and interpolating said right half beams of said pair of beams in response to an azimuthal error signal to provide an interpolated left half beam signal and an interpolated right half beam signal;

means for beamforming each of said left half and right half beam signals to provide upper left half, lower left half, upper right half and lower right half beam signals; and means for combining said signals to provide said azimuthal error signal and declination/elevation error signal, said declination/elevation error signal being provided to said second beamforming means to cause the declination/elevation error signal provided by a signal source to form a beam having a main response axis centered on said signal source.

9. A sonar tracking system comprising:

a plurality of transducers arranged in a plurality of circular rows, each transducer adapted to receive a signal from a signal source, and each transducer of a row being spaced from its adjacent transducer by an included angle measured from the center of said circular row;

first means for combining the output of selected adjacent transducers in a row for providing two left half and two right half beam signals having main response axes in predetermined azimuthal and declination/elevation directions, said azimuthal directions differing in angle by the included angle of the transducers of the row;

second means for combining the left half beam signals and the right half beam signals in response to the signal from a source to provide interpolated right and left half beam signals having their main response axis centered on said signal sources;

a plurality of said first and second combining means, each connected to selected adjacent transducers of a corresponding one of said plurality of adjacent rows;

third means responsive to and combining the interpolated right half beam signals of the rows of transducers to form upper and lower right half beam signals having their main response axis centered on said signal source;

fourth means responsive to and combining the interpolated left half beam signals of the rows of transducers to form upper and lower left half beam signals having their main response axis centered on said signal source;

means responsive to and combining said upper and lower right and left half beam signals to provide left-right and up-down error signals indicative of the angular direction by which said main response axis is to the right or left and up or down from said signal source;

said left-right and up-down error signals being provided as input signals to said first combining means, and said third and fourth combining means, respectively.

* * * * *